Sept. 16, 1969  G. R. J. E. LEGUEN DE LACROIX  3,466,943
VARIABLE-RATIO LEVER MECHANISMS
Filed Jan. 4, 1968  2 Sheets-Sheet 1

Inventor
George Rancliffe J.E.L. De Lacroix
By D. D. McShane
Attorney

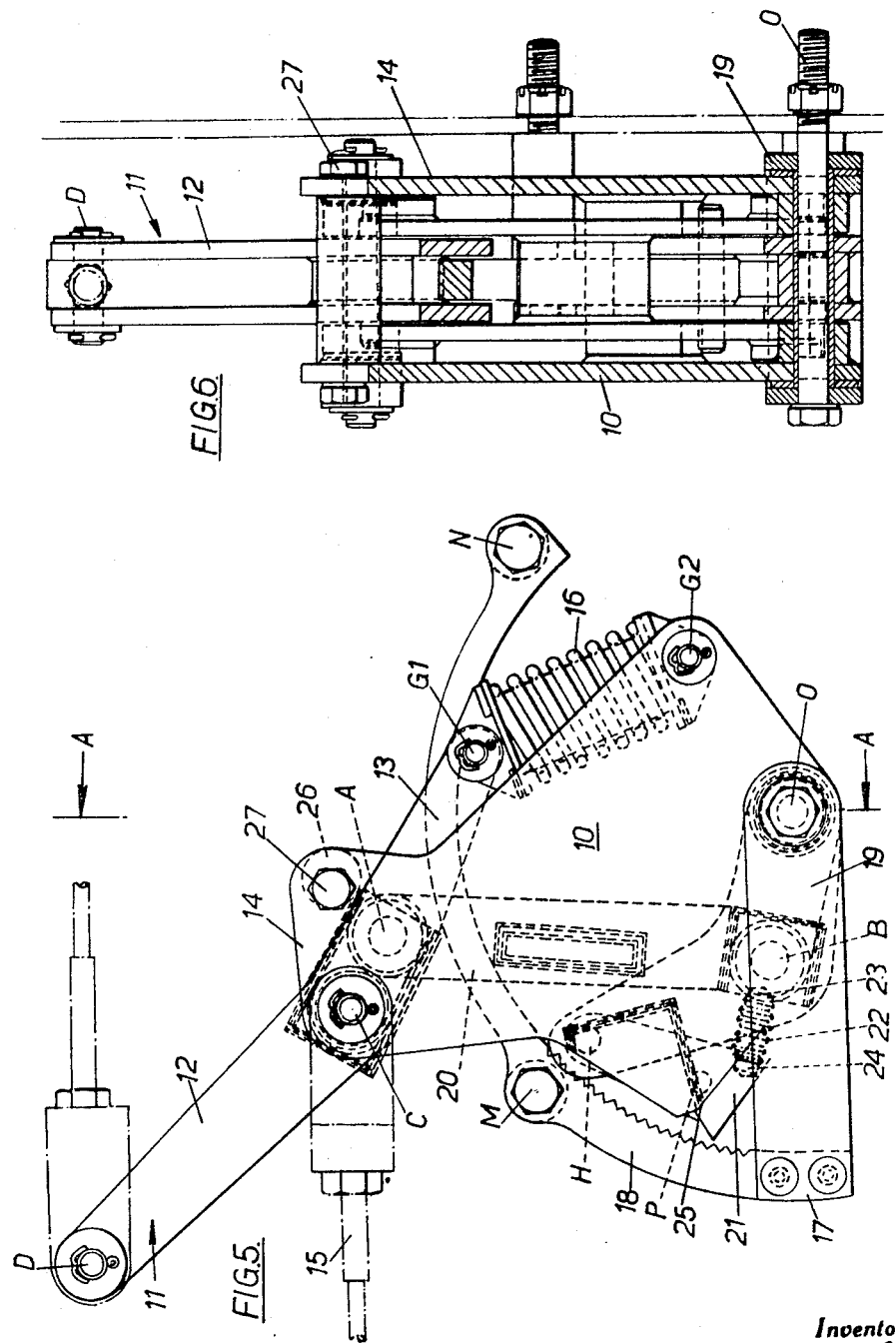

United States Patent Office 3,466,943
Patented Sept. 16, 1969

3,466,943
VARIABLE-RATIO LEVER MECHANISMS
George Rancliffe Jehan Eugene Leguen de Lacroix, Halesworth, England, assignor to General Motors Corporation, a corporation of Delaware
Filed Jan. 4, 1968, Ser. No. 695,739
Claims priority, application Great Britain, Jan. 19, 1967, 2,813/67
Int. Cl. G05g 1/04
U.S. Cl. 74—516        10 Claims

ABSTRACT OF THE DISCLOSURE

A variable-ratio lever mechanism, primarily intended for use as a remotely controlled brake actuator mechanism to give an initial quick take-up of slack and subsequently—after yielding of a resilient link—a brake apply movement at a high mechanical advantage, includes a four-bar chain mechanism with crossed links. These links comprise an input lever, a link member, a pawl lever, and an output actuator lever; the output actuator lever has an output linkage connected intermediate its ends, one end of the output actuator lever is mounted on a fixed pivot, and the other end of the output actuator lever forms a pivotal mounting for the input lever, one arm of the input lever being connected to an input mechanical linkage.

---

This invention relates to variable-ratio lever mechanisms.

The invention is concerned with such variable-ratio lever mechanisms as produce in an initial portion of a stroke a large output movement with a low output force, and in a final portion of the stroke a high output force. These mechanisms can be used, for example in a motor vehicle braking system, to give an initial quick take-up of slack in an output linkage, for example a cable or rod system, at a low mechanical advantage, followed by a final increment of movement at a high mechanical advantage.

According to the present invention, a variable-ratio lever mechanism comprises a double-arm input lever pivotally mounted on one end portion of an output astuator lever which is mounted at its other end portion on a fixed pivot, the output actuator lever being connected intermediate its ends to an output linkage, one arm of the input lever being movable by an input mechanical linkage to which the arm is connected, and the other arm of the input lever being pivotally connected to one end of a resiliently yieldable link the other end of which is pivotally connected to the output actuator lever at a point spaced from the fixed pivot, and a link member pivotally connecting the input lever at a point between the pivot for the yieldable link and the mounting pivot for the input lever to a pawl lever one end portion of which is pivotally mounted on the fixed pivot and the other end portion of which forms a pivotal mounting for a locking pawl which in one position of the mechanism can engage a fixed ratchet, the arrangement being such that in an initial increment of movement of the input lever the mechanism moves as a whole about the fixed pivot, in a further increment of movement the yieldable link yields at a design output load and allows the link member to move the pawl lever about the fixed pivot to bring the locking pawl into engagement with the fixed ratchet, and in a final increment of movement a four-bar chain mechanism constituted by one arm of the input lever, the link member, the pawl lever and the output actuator lever produces an increased mechanical advantage at the output actuator lever.

The variable-ratio lever mechanism according to the present invention is thus intended to act as a relay mechanism (slave mechanism), in transmitting force from the input mechanical linkage at varying mechanical advantages to the output linkage, and is applicable to various types of machine, inter alia a motor vehicle braking system.

The input and output linkages may for example comprise rods or cables.

The yieldable link may comprise a compression spring assembly. By the use of an over-centre action, the compression spring assembly can be made to assist movement of the output linkage during the final increment of movement of the input lever, thus increasing the overall mechanical advantage of the mechanism.

The locking pawl may be resiliently biased towards the fixed ratchet. During the initial increment of movement of the input lever, the locking pawl may be maintained out of contact with the fixed ratchet by a pin-and-abutment connection between the locking pawl and the output actuator lever.

The locking pawl may be engageable with a set of teeth of the fixed ratchet which are disposed on a concavely arcuate surface of the fixed ratchet.

The output actuator lever may have an adjustable abutment for limiting movement of the input lever relatively to the output actuator lever in the release direction.

The output actuator lever may comprise a pair of spaced side plates between which some of the parts of the mechanism are mounted. In this way a symmetrical construction can be achieved, for favourable distribution of the forces acting on the mechanism; the output actuator lever also gives some protection to the remaining parts of the mechanism.

The input lever and the pawl lever may each be cranked, as seen in elevation, such that the three pivotal connections for each of these levers do not lie on a straight line.

In the accompanying drawings:

FIG. 5 is a greatly enlarged elevational view of the embodiment of the variable-ratio lever mechanism shown in FIGS. 1 to 4; and FIG. 6 is a cross-section on the line VI—VI of FIG. 5, in the direction of the arrows.

Figure 1:
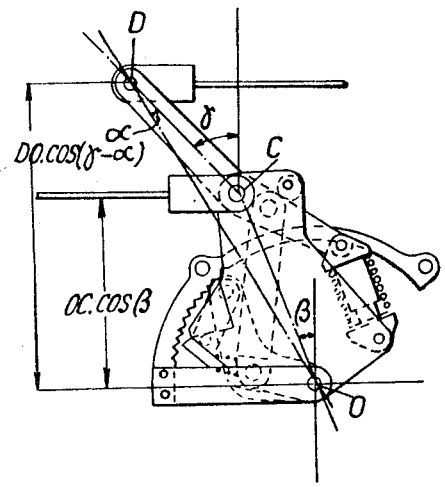
FIGS. 1 to 4 are schematic views showing one embodiment of a variable-ratio lever mechanism according to the invention in, respectively, an "off" position, two intermediate positions, and a "fully on" position.

As shown for example in FIG. 5, the variable-ratio lever mechanism 10 includes an input lever 11 which comprises a first arm 12 connected to a rod-type input mechanical linkage and a second, relatively short arm 13, and is pivotally mounted by a pivot pin C on one end portion of an output actuator lever 14. The output actuator lever 14 is constructed as a pair of laterally spaced, interconnected side plates, and is mounted at its other end portion on a fixed pivot bolt O. A rod-type output linkage 15 is connected by means of a clevis to the pivot pin C. The free end portion of the second arm 13 of the input lever 11 is pivotally connected at a pivot point $G_1$ to one end of a yieldable connection constituted by a compression spring assembly 16 the other end of which is pivotally connected to the output actuator lever at a pivot point $G_2$ spaced from the fixed pivot O.

The pivot bolt O passes through a hole in a fixing bracket assembly 17, and is supported by a fixed frame portion of a machine. An arcuate portion of the fixing bracket assembly is secured by bolts M and N to the fixed frame portion, and includes a fixed ratchet 18 of arcuate form.

A pawl lever 19 is mounted at one end on the fixed pivot bolt O, and is pivotally connected at point B intermediate its ends to one end of a straight link member 20 the other end of which is pivotally connected to the second arm 13 of the input lever 11 at a point A between the pivotal connection $G_1$ of the compression spring assembly 16 and the pivot pin C. The input lever 11 and the pawl lever 19 are cranked as seen in elevation.

A locking pawl 21 is pivotally mounted on the pawl lever 19 by means of a pivot pin H at the end of the pawl lever remote from the fixed pivot O. A helical compression spring 22 is mounted at one end on a compression guide 23 fixed to the pawl lever 19, and at the other end on a spring guide 24 fixed to the locking pawl 21, such that the helical compression spring 22 resiliently biases the locking pawl 21 towards the fixed ratchet 18. A pin P projecting from the locking pawl 21 engages an abutment surface 25 on the output actuator lever 14 in some positions of the mechanism to prevent the locking pawl 21 from engaging the fixed ratchet 18, as will subsequently be described in relation to the operation of the variable-ratio lever mechanism.

A cylindrical stop 26 is fixed to the output actuator lever 14 by means of a fixing bolt 27 in the vicinity of the pivot pin C for the input lever 11, the position of the stop is adjusted to limit the movement of the input lever 11 relatively to the output actuator lever 14 in a release direction of the mechanism.

To operate the variable-ratio lever mechanism the operator pulls a manually operable control lever (not shown) from an "off" position towards an "on" position. This produces movement of the input lever: in an initial increment of movement of the input lever, a control mechanism (not shown) actuable by the output linkage 15 offers insufficient resistance to cause yielding of the compression spring assembly 16 arranged between the input lever and the output actuator lever 14, and accordingly the input lever and the output actuator lever move as a whole about the fixed pivot O, forming a simple two-arm lever for "take-up" of play or slack in the output linkage and control mechanism at a low mechanical advantage.

Figure 2:
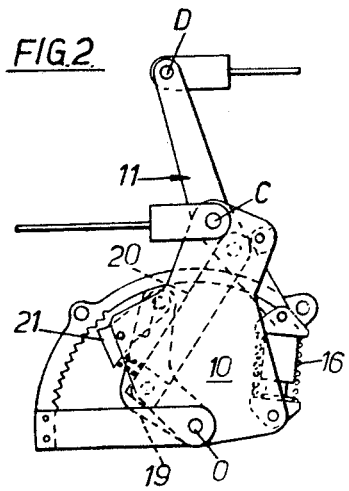
Figure 3:
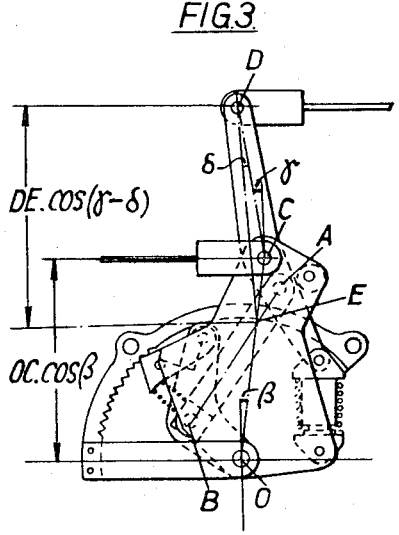

When the play or slack has been taken up, the resistance offered by the output linkage 15 is such that further movement of the input lever causes yielding of the compression spring assembly 16. The input lever 11 thereupon rotates relatively to the output actuator lever 14 in a clockwise direction about the pivot pin C between these two levers. The resulting clockwise movement of the second, short arm 13 of the input lever 11 about the pivot pin C is transmitted by the link member 20 to the pawl lever 19, and causes the pawl lever to rotate relatively to the output actuator lever 14, in an anti-clockwise direction about the fixed pivot bolt O. This action continues until, as shown in FIG. 2, the relationship between the abutment surface 25 on the output actuator lever 14 and the pin P projecting from the locking pawl 21 is such that this pin can slide along and thereby be released from the abutment surface to allow the locking pawl to begin to engage the concave set of teeth on the fixed ratchet 18, as shown in FIG. 3.

When the locking pawl 21 engages the fixed ratchet 18, no further anti-clockwise movement of the pawl lever 19 is possible, because both ends of the pawl lever are held fixed. During further movement of the input lever 11, movement of the output actuator lever 14 occurs at an increased mechanical advantage, by the action of a four-bar chain mechanism BACO (best seen in FIG. 5), the link OB of which is fixed. Specifically, this four-bar chain mechanism is constituted by the link member 20 (BA), the part AC of the short arm 13 of the input lever 11, the part CO of the output actuator lever 14, and the pawl lever 19 (fixed link OB).

Finally, the pivotal connection $G_1$ between the short arm 13 of the input lever and the compression spring assembly 16 passes the line which joins the pivot pin C between the input lever 11 and the output actuator lever 14 to the pivotal connection $G_2$ between the compression spring assembly and the output actuator lever, whereupon an over-centre action occurs which causes the compression spring assembly to assist the final increment of movement of the input lever into the "on" position, in which the control mechanism is fully engaged. To disengage the control mechanism, the operator moves the operating lever in the reverse direction; this causes disengagement of the control mechanism, with changes in the lever mechanism occurring in the reverse order to that during engagement. Movement of the input lever in the release direction is limited by the cylindrical stop 26 of the output actuator lever 14.

By means of the variable-ratio lever mechanism which has been described, a large output movement at a very low mechanical advantage is possible for take-up of play or slack in the output linkage and mechanism being controlled, followed by output movement at a high mechanical advantage, with assistance from the compression spring assembly. With a link configuration such as is shown in the accompanying drawings, the mechanical advantage increases progressively after the change-over position at which take-up of play or slack ceases and output operation begins, thereby producing a favourable course of output engagement, with the assistance given by the over-centre action of the compression spring contributing to good efficiency.

For the variable-ratio lever mechanism shown in the drawings, the lever ratio during the initial increment of movement of the input lever is $$\frac{T_2}{T_1} = \frac{DO \cdot \cos(\gamma - \alpha)}{OC \cdot \cos \beta}$$

where D is the effective point of application of input force to the input lever 11, and $\gamma$, $\alpha$ and $\beta$ are the angles shown in FIG. 1 and in the list below, namely, respectively, the angle between DC and the vertical, the angle CDO, and the acute angle between CO and the vertical.

The lever ratio during the final increment of movement of the input lever is $$\frac{T_2}{T_1} = \frac{OC \cdot DE \cdot \cos(\gamma - \delta)}{EC \cdot OC \cdot \cos \beta}$$

Figure 4:
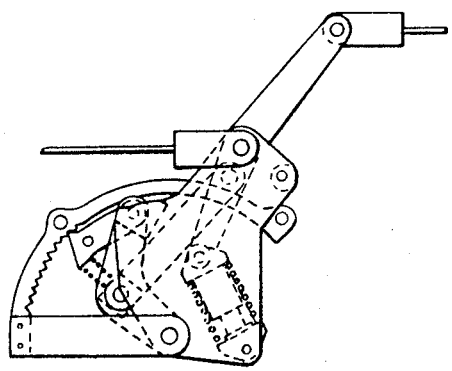

(excluding the effect of the spring), where E (shown in FIG. 3) is a point at the intersection of an axis joining the points O and C and an axis joining the points A and B, at and immediately after the change-over position, and $\delta$ is the angle shown in FIG. 3 and in the list below, namely the angle CDE. If the efficiency is assumed to be 100%, the initial mechanical advantage (in the FIG. 1 position) is $$\frac{T_2}{T_1} = \frac{DO \cdot \cos(\gamma - \alpha)}{OC \cdot \cos \beta}$$

and the final mechanical advantage (in the FIG. 4 position) is $$\frac{T_2}{T_1} = \frac{OC \cdot DE \cdot \cos(\gamma - \delta)}{EC \cdot OC \cdot \cos \beta} - \frac{(OC - EC) F_s \cdot l_1 \sin \phi}{T_1 \cdot EC \cdot OC \cdot \cos \beta}$$

where:

$T_1$ = Force applied at point D on input lever, at $90 - \gamma$ relatively to DC;

$T_2$ = Force applied by output actuator lever, at $90 - \beta$ relatively to OC;

$$F_s = S \left[ \frac{L + t_1 + t_2}{(1 + K^2 - 2K \cos \theta)^{1/2}} - R_5 \right] \frac{\sin \theta}{\sin \phi}$$

S = stiffness of spring;
$l_1 = CG_2$;
L = free length of spring;
$t_1 = t_2$ = length of attachment portions at ends of spring;

$$K = \frac{l_1}{R_5}$$

$R_5 = CG_1$;
$\theta$ = angle $G_1CG_2$;

α = angle CDO;
δ = angle CDE;
β = the angle between OC and the vertical through O in the positions shown in FIGS. 2 and 3 respectively;
φ = angle $G_1G_2C$
θ and φ are negative after the over-centre position of the yieldable link has occurred on the application of the required control.

The variable-ratio lever mechanism which has just been described is compact, and can readily be located at a convenient position in a vehicle braking system (for example a system on the lines of that described and shown in my co-pending United States patent specification Ser. No. 554,175, filed May 31, 1966) or in some form of stationary machine. A useful feature of the present mechanism in this respect is that the input and output linkages can be located relatively close together, so facilitating installation in a location such as along a frame member of a motor vehicle. Also, since the output linkage is subject to relatively high loads, it is desirable to locate the lever mechanism in a position allowing the use of a short output linkage: when a cable is used as the output linkage, such a location limits the possible amount of extension of the highly loaded cable.

I claim:
1. A variable-ratio lever mechanism comprising a double-arm input lever pivotally mounted on one end portion of an output actuator lever which is mounted at its other end portion on a fixed pivot, the output actuator lever being connected intermediate its ends to an output linkage, one arm of the input lever being movable by an input mechanical linkage to which the arm is connected, and the other arm of the input lever being pivotally connected to one end of a resiliently yieldable link the other end of which is pivotally connected to the output actuator lever at a point spaced from the fixed pivot, and a point spaced from the fixed pivot, and a link member pivotally connecting the input lever at a point between the pivot for the yieldable link and the mounting pivot for the input lever to a pawl lever one end portion of which is pivotally mounted on the fixed pivot and the other end portion of which forms a pivotal mounting for a locking pawl which in one position of the mechanism can engage a fixed ratchet, the arrangement being such that in an initial increment of movement of the input lever the mechanism moves as a whole about the fixed pivot, in a further increment of movement the yieldable link yields at a design output load and allows the link member to move the pawl lever about the fixed pivot to bring the locking pawl into engagement with the fixed ratchet, and in a final increment of movement a four-bar chain mechanism constituted by one arm of the input lever, the link member, the pawl lever and the output actuator lever produces an increases mechanical advantage at the output actuator lever.

2. A variable-ratio lever mechanism according to claim 1, wherein the input and output linkages comprise rods.

3. A variable-ratio lever mechanism according to claim 1, wherein the input and output linkages comprise cables.

4. A variable-ratio lever mechanism according to claim 1, wherein the yieldable link compires a compression spring assembly.

5. A variable-ratio lever mechanism according to claim 1, including means resiliently biasing the locking pawl towards the fixed ratchet.

6. A variable-ratio lever mechanism according to claim 5, having a pin-and-abutment connection between the locking pawl and the output actuator lever such that the locking pawl is maintained out of contact with the fixed ratchet during the initial increment of movement of the input lever.

7. A variable-ratio lever mechanism according to claim 1, wherein the locking pawl is engageable with a set of teeth of the fixed ratchet which are disposed on a concavely arcuate surface of the fixed ratchet.

8. A variable-ratio lever mechanism according to claim 1, wherein the output actuator lever has an adjustable abutment for limiting movement of the input lever relatively to the output actuator lever in the release direction.

9. A variable-ratio lever mechanism according to claim 1, wherein the output actuator lever comprises a pair of spaced side plates between which some of the parts of the mechanism are mounted.

10. A variable-ratio lever mechanism according to claim 1, wherein the input lever and the pawl lever are each cranked, as seen in elevation, such that the three pivotal connections for each of these levers do not lie on a straight line.

References Cited
UNITED STATES PATENTS 2,985,032  5/1961  Schroter et al. _____ 74—516
3,310,994  3/1967  Schroter _____ 74—516

FRED C. MATTERN, Jr., Primary Examiner
F. D. SHOEMAKER, Assistant Examiner